(12) United States Patent
Komine et al.

(10) Patent No.: US 8,145,284 B2
(45) Date of Patent: Mar. 27, 2012

(54) PORTABLE TERMINAL INCLUDING FIRST CASING AND SECOND CASING RETRACTABLY ACCOMMODATED IN FIRST CASING

(75) Inventors: Yasushi Komine, Hino (JP); Akira Watanabe, Fuchu (JP); Hisashi Higashigawa, Higashiyamato (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 834 days.

(21) Appl. No.: 12/166,615

(22) Filed: Jul. 2, 2008

(65) Prior Publication Data

US 2009/0135555 A1    May 28, 2009

(30) Foreign Application Priority Data

Nov. 22, 2007  (JP) .................................. 2007-303301

(51) Int. Cl.
*H04M 1/03* (2006.01)
(52) U.S. Cl. .................................................. 455/575.4
(58) Field of Classification Search .............. 455/575.1, 455/575.4
See application file for complete search history.

(56) References Cited

U.S. PATENT DOCUMENTS

| | | | | |
|---|---|---|---|---|
| 7,149,557 B2 * | 12/2006 | Chadha | ...................... | 455/575.1 |
| 7,257,432 B2 * | 8/2007 | Nan | .......................... | 455/575.4 |
| 7,512,427 B2 * | 3/2009 | Finke-Anlauff et al. | .. | 455/575.1 |
| 2003/0153280 A1 * | 8/2003 | Kopp et al. | ..................... | 455/90 |

FOREIGN PATENT DOCUMENTS

JP          2007-006146 A      1/2007

* cited by examiner

*Primary Examiner* — Blane J Jackson
(74) *Attorney, Agent, or Firm* — Maschoff Gilmore & Israelsen

(57) ABSTRACT

A portable terminal includes a first casing having a first wiring board, a first operation portion, and an accommodating portion opened in its peripheral surface, and a second casing configured to be accommodated in the accommodating portion through the opening and having a second wiring board and a second operation portion. A casing movement guiding/supporting mechanism is interposed between one side portion of the first casing and that of the second casing in one direction intersecting a moving locus of the second casing between a retracted position and an extended position in relation to the accommodating portion, and supports the second casing to be movable linearly between the retracted and extended positions. The second casing is selectively locked at the retracted position by a locking mechanism. A battery for supplying electricity to the wiring boards is accommodated in an accommodating chamber in at least one of the casings.

19 Claims, 5 Drawing Sheets

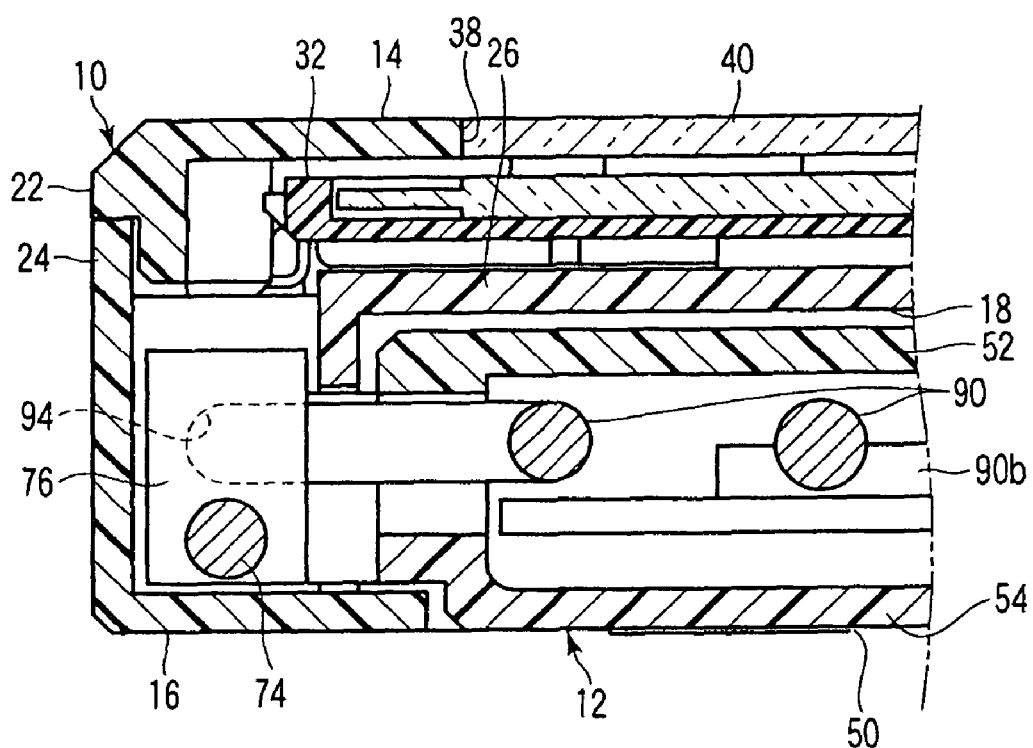
F I G. 4
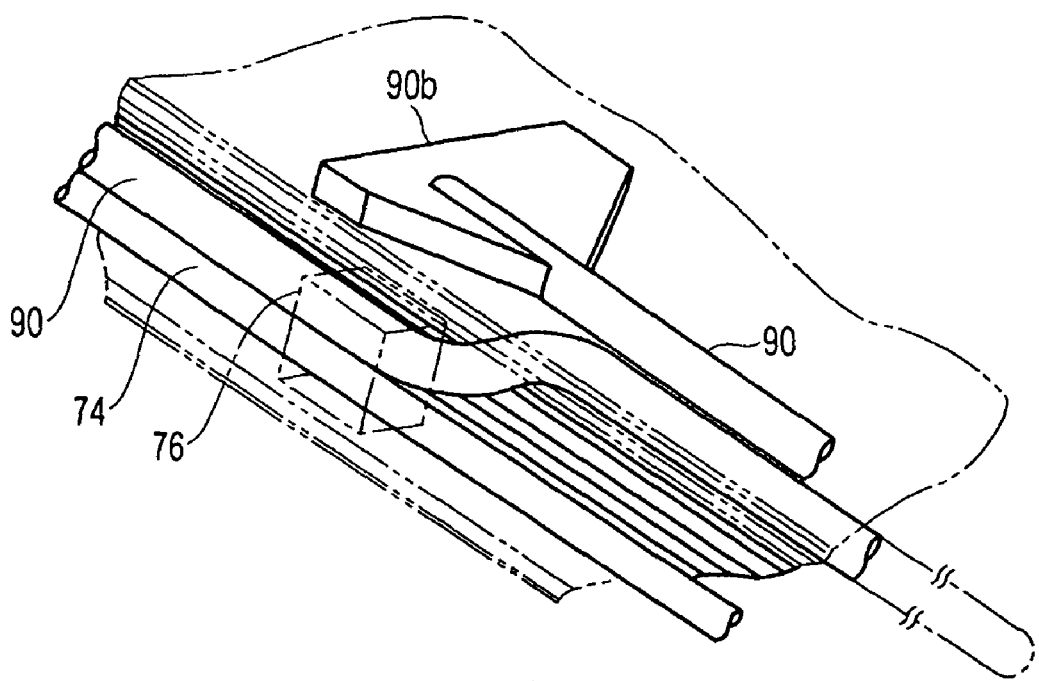
F I G. 5

PORTABLE TERMINAL INCLUDING FIRST CASING AND SECOND CASING RETRACTABLY ACCOMMODATED IN FIRST CASING

CROSS-REFERENCE TO RELATED APPLICATIONS

This application is based upon and claims the benefit of priority from prior Japanese Patent Application No. 2007-303301, filed Nov. 22, 2007, the entire contents of which are incorporated herein by reference.

BACKGROUND OF THE INVENTION

1. Field of the Invention

The present invention relates to a portable terminal.

2. Description of the Related Art

A portable terminal is known as for example a mobile phone, a portable information terminal which can be held and operated by both hands of a user, or the like.

The portable terminals are classified into mono-form type ones, foldable type ones, and stretchable type ones.

The foldable type and stretchable type portable terminals are known from, for example, Japanese Patent Application (KOKAI) Publication No. 2007-6146. The stretchable type portable terminal is provided with a first casing and a second casing. The first casing has an approximately rectangular shape and includes a first wiring board and a first operation portion. The second casing also has an approximately rectangular shape, a size of which is approximately equal to that of the first casing, and includes a second wiring board electrically connected to the first wiring board and a second operation portion. The second casing is supported to the first casing by a casing linear movement guiding mechanism interposed between the first casing and the second casing, so that the second casing can be movable linearly along a longitudinal direction of the first casing between a stacking position where the second casing is stacked under the first casing and an extended position where the second casing is extended from one end which is a part of a peripheral surface of the first casing.

The conventional casing linear movement guiding mechanism is interposed between the first casing and the second casing, so that the guiding mechanism is passed through flat surfaces of the first and second casings facing each other. Further, the guiding mechanism is positioned at an approximately center position of each of the first and second casings in their lateral directions. Accordingly, the conventional guiding mechanism requires relatively large volumes in respective internal spaces of the first and second casings, and makes arrangements of the first and second wiring boards in the respective internal spaces of the first and second casings being difficult. As a result of this, it is difficult to further thin respective sizes ("thicknesses") of the first and second casings in a direction ("thickness direction") where the first casing and the second casing are stacked on one another.

BRIEF SUMMARY OF THE INVENTION

According to one aspect of this invention, a portable terminal comprises: a first casing including a first wiring board, a first operation portion, a first surface on which the first operation portion is disposed, a second surface which faces in a direction opposite to the first surface, a peripheral surface which connects a peripheral edge of the first surface and a peripheral edge of the second surface, and an accommodating portion which is disposed between the first surface and the second surface and which is opened in the peripheral surface; a second casing including a second wiring board which is electrically connected to the first wiring board, a second operation portion, a first surface on which the second operation portion is disposed, and a second surface which faces in a direction opposite to the first surface, the second casing being configured to be accommodated in the accommodating portion of the first casing through the opening; a casing movement guiding/supporting mechanism interposed between a side portion of the first casing and a side portion of the second casing in at least one of two direct opposite directions which intersect a moving locus of the second casing between a retracted position and an extended position along the first surface of the first casing, at the retracted position the second casing being accommodated in the accommodating portion of the first casing and at the extended position the second casing being extended from the accommodating portion into an external space through the opening, and the guiding/supporting mechanism supporting the second casing to be movable linearly between the retracted position and the extended position; a locking mechanism selectively locking the second casing at the retracted position, and allowing a movement of the second casing between the retracted position and the extended position when the locking mechanism unlocks the second casing; and a battery accommodating chamber provided in at least one of the first casing and the second casing and accommodating a battery for supplying electricity to the first wiring board and the second wiring board.

According to another aspect of this invention, a portable terminal comprises: a first casing including a first wiring board, a first operation portion, a first surface on which the first operation portion is disposed, a second surface which faces in a direction opposite to the first surface, a peripheral surface which connects a peripheral edge of the first surface and a peripheral edge of the second surface, and an accommodating portion which is disposed between the first surface and the second surface and which is opened in the peripheral surface; a second casing which includes a second wiring board, a second operation portion, a first surface on which the second operation portion is disposed, and a second surface which faces in a direction opposite to the first surface, the second casing being configured to be accommodated in the accommodating portion of the first casing through the opening; a casing movement guiding/supporting mechanism interposed between a side portion of the first casing and a side portion of the second casing in at least one of two direct opposite directions which intersect a movement locus of the second casing between a retracted position and an extended position along the first surface of the first casing, at the retracted position the second casing being accommodated in the accommodating portion of the first casing and at the extended position the second casing being extended from the accommodating portion into an external space through the opening, and the guiding/supporting mechanism supporting the second casing to be movable linearly between the retracted position and the extended position; a wiring cable including one end portion which is electrically connected to the first wiring board, the other end portion which is electrically connected to the second wiring board, and an intermediate portion between the one end portion and the other end portion; a cable movement guiding mechanism interposed between the first casing and the second casing and guiding a movement of the intermediate portion of the wiring cable when the second casing is moved between the retracted position and the extended position; a locking mechanism selectively locking the second casing at the retracted position, and allowing a movement of the second casing between the retracted position and the extended position when the locking mechanism unlocks the second casing; and a battery accommodating chamber provided in at least one of the first casing and the second casing and accommodating a battery for supplying electricity to the first wiring board and the second wiring board.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 4 is a cross-sectional view schematically showing a cross-section of a part of the mobile phone shown in FIG. 1;

FIG. 5 is perspective view schematically showing a moving member functioning as a cable movement guiding mechanism and a part near around the moving member, in a casing movement guiding/supporting mechanism of the mobile phone shown in FIG. 1.

DETAILED DESCRIPTION OF THE INVENTION

A mobile phone according to an embodiment of a portable terminal of the present invention will be explained below in detail with reference to the attached drawings.

Figure 1:
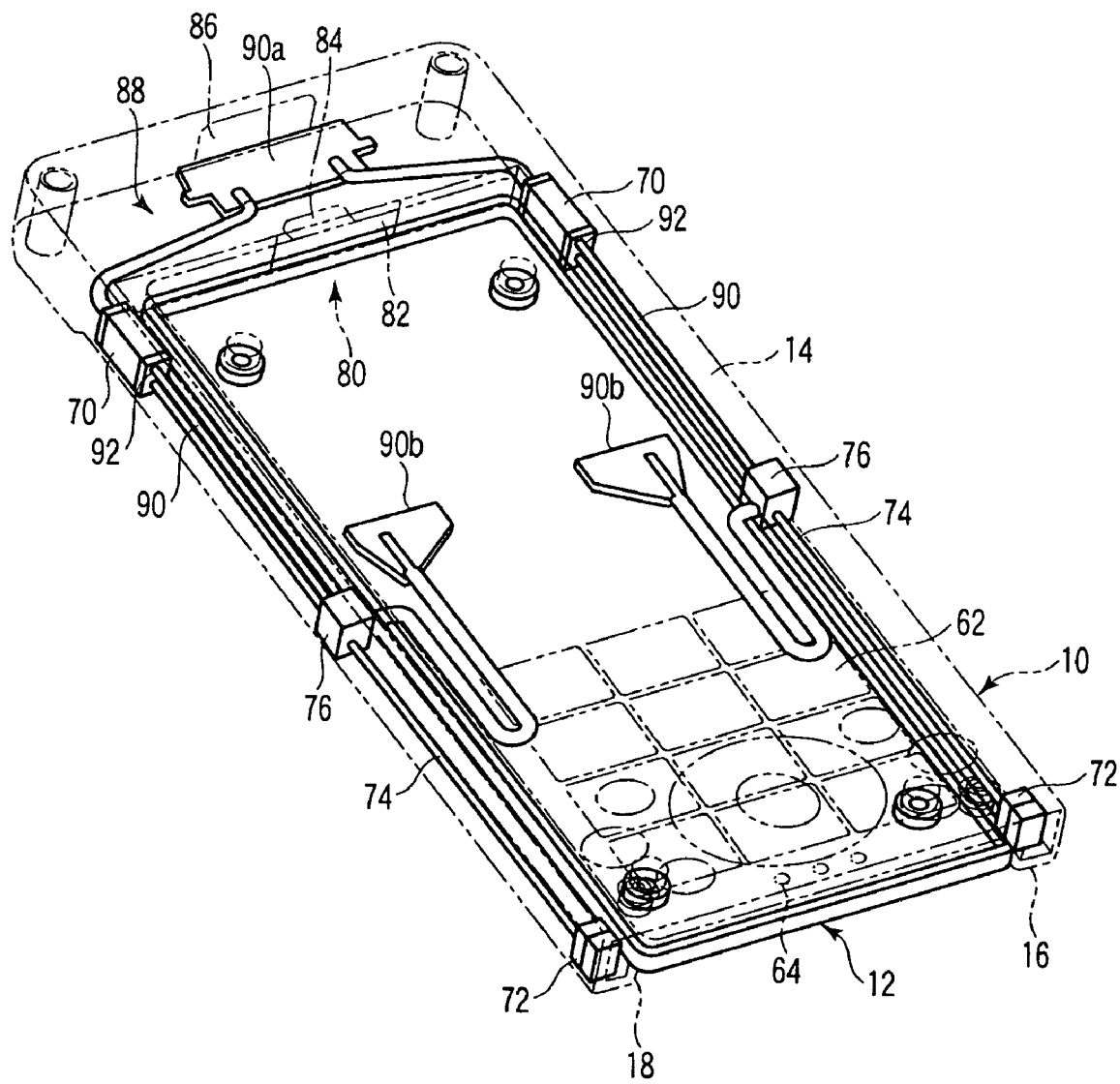
FIG. 1 is a perspective view schematically showing a main configuration of a mobile phone according to an embodiment of a portable terminal of the present invention in a contracted state.
Figure 2:
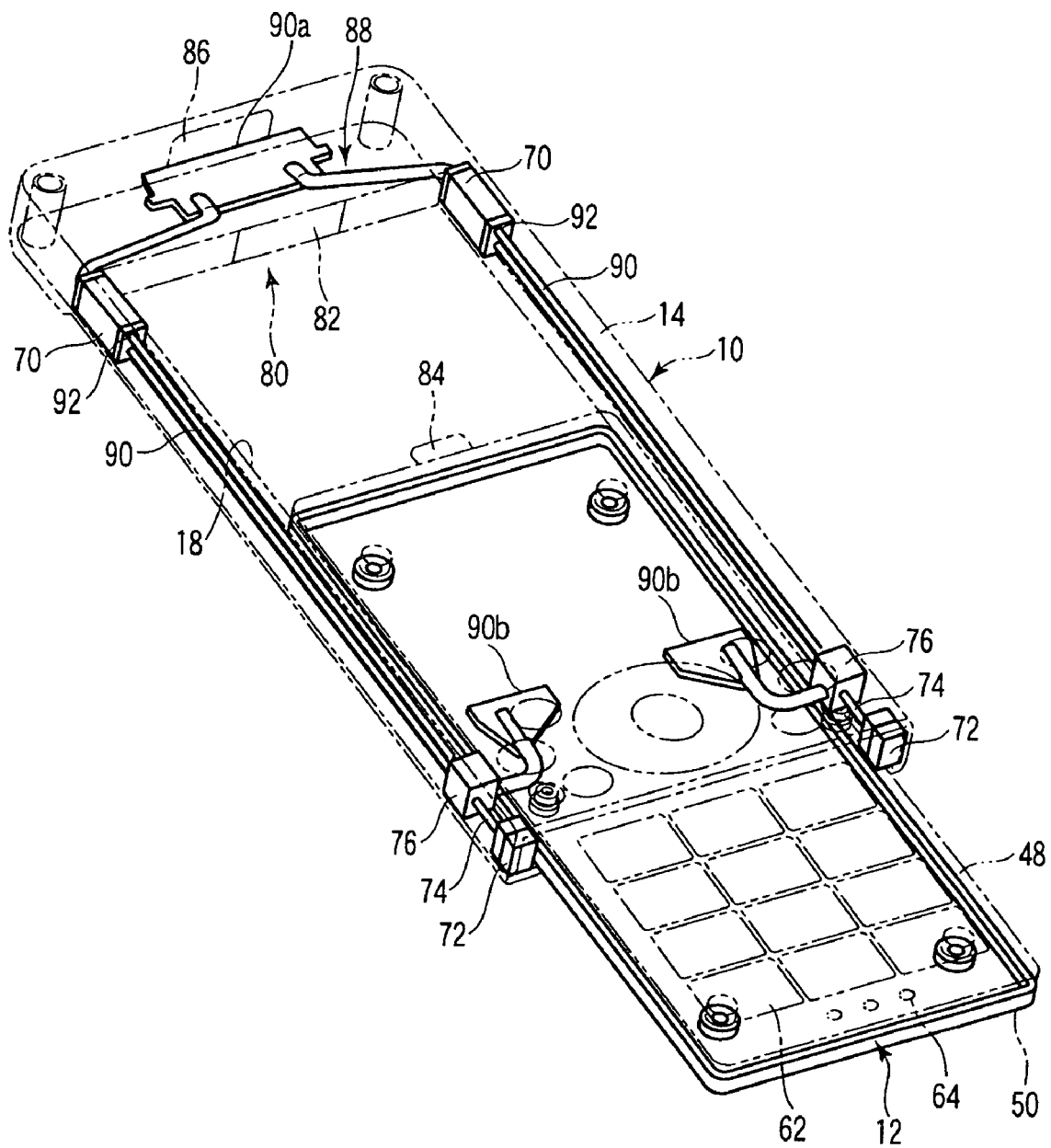
FIG. 2 is a perspective view schematically showing the main configuration of the mobile phone shown in FIG. 1 in an extended state.

As shown in FIGS. 1 and 2, the mobile phone according to the embodiment of the portable terminal of the present invention comprises a first casing 10 with an approximately rectangular shape and a second casing 12 with an approximately rectangular shape and a size of which is slightly smaller than that of the first casing 10.

In FIGS. 1 and 2, the whole structure of the first casing 10 and a structure of a part of the second casing 12 are illustrated by two-dot chain line for better understanding.

The first casing 10 includes first and second flat and large surfaces 14 and 16 facing in directions opposite to each other, a peripheral surface connecting an approximately rectangular peripheral edge of the first surface 14 and an approximately rectangular peripheral edge of the second surface 16, and an accommodating portion 18 disposed between the first surface 14 and the second surface 16. The accommodating portion 18 is configured to be capable of accommodating the second casing 12, and it has an opening 20 in one end part of the peripheral surface positioned in a longitudinal direction of the first casing 10. The opening 20 allows extension and retraction of the second casing 12 from and into the accommodating portion 18.

FIG. 1 shows the second casing 12 which has been positioned at a retracted position in the accommodating portion 18 of the first casing 10, and FIG. 2 shows the second casing 12 which has been positioned at an extended position where the second casing 12 has been extended from the accommodating portion 18 of the first casing 10 to an outside space through the opening 20.

Figure 3:
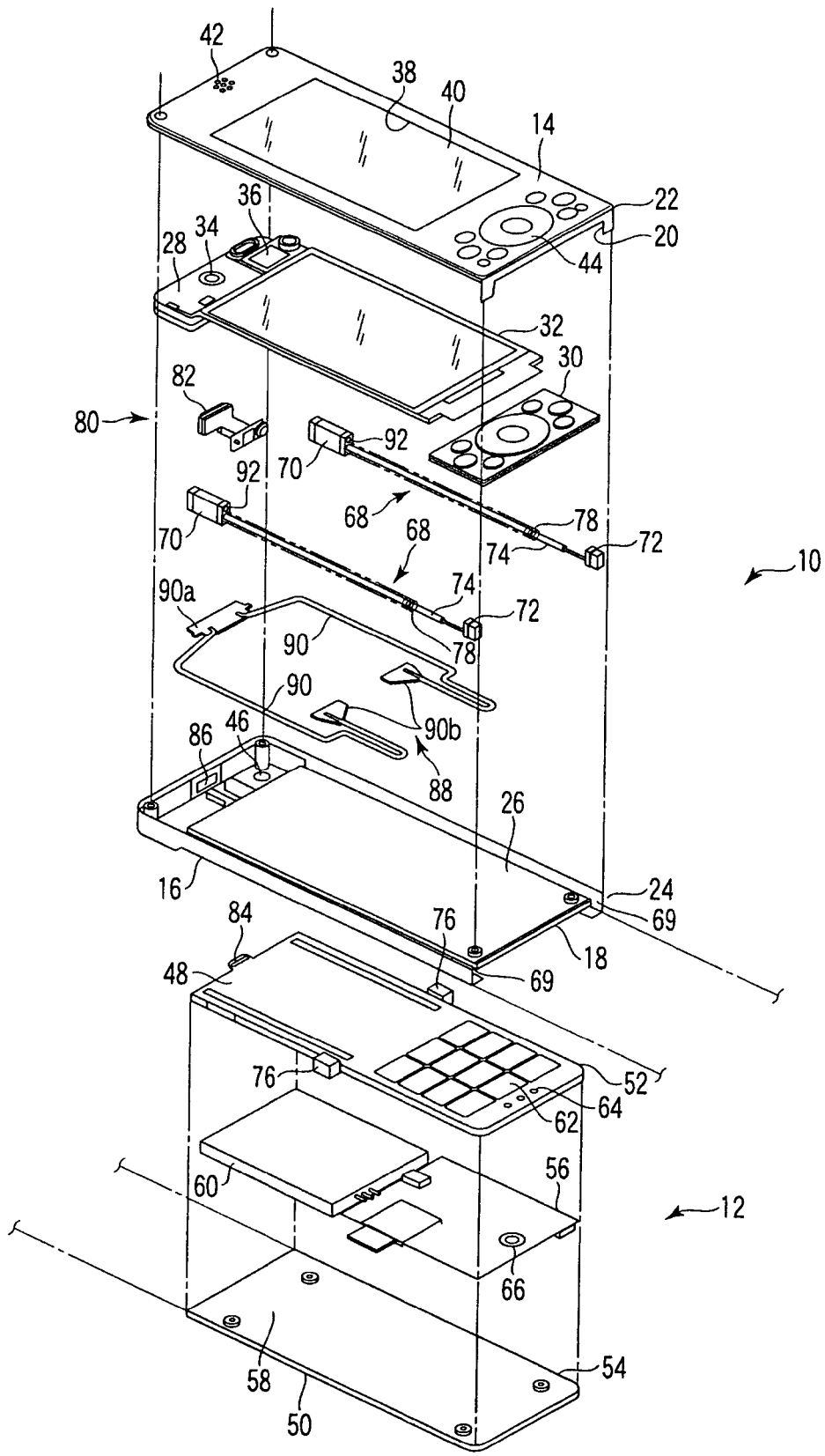
FIG. 3 is a schematic exploded perspective view of the mobile phone shown in FIG. 1.
Figure 6:
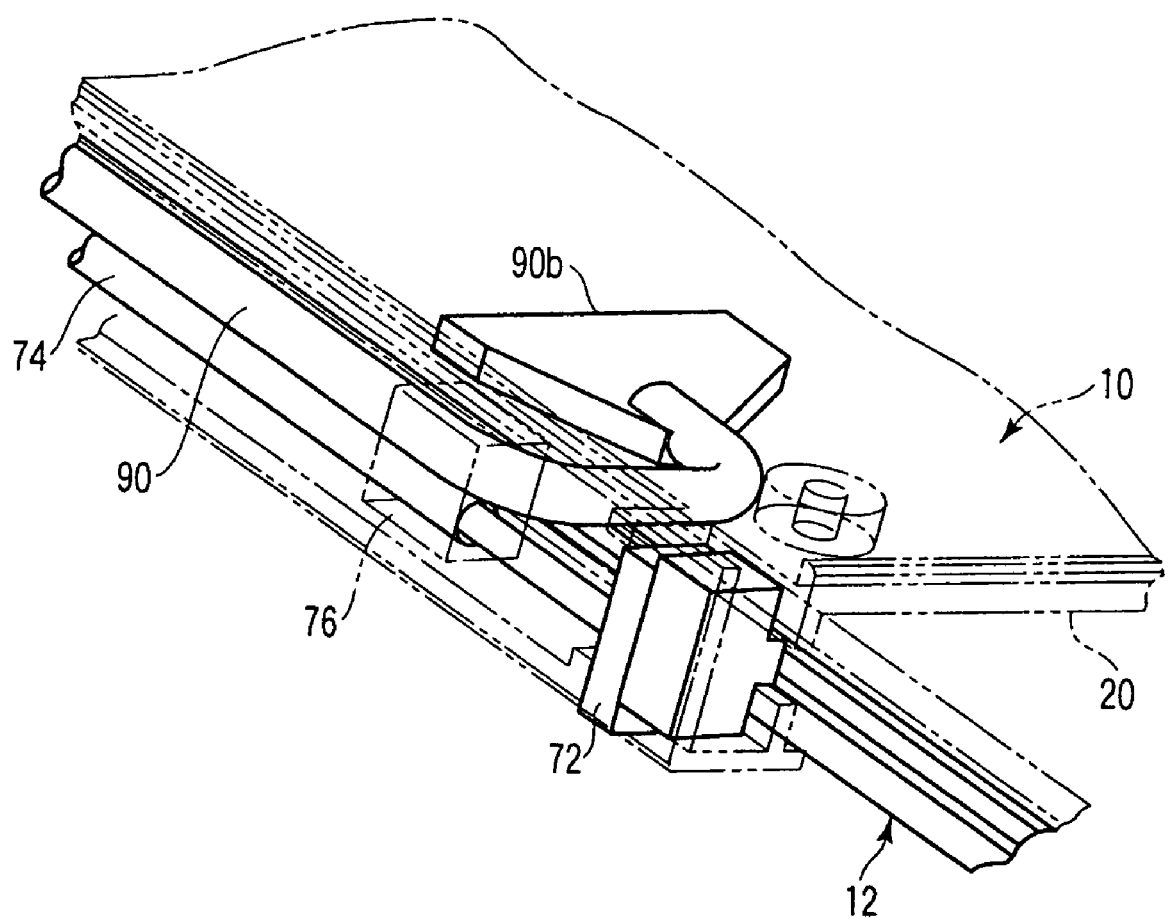
FIG. 6 is a perspective view schematically showing the moving member functioning as the cable movement guiding mechanism and the part near around the moving member, in the casing movement guiding/supporting mechanism of the mobile phone shown in FIG. 2.

Especially, as shown in detail in FIG. 3, the first casing 10 includes an upper half piece 22 and a lower half piece 24 fixed to each other in a separable manner by a known fixing element (not shown) such as, for example, a plurality of fixing screws.

The upper half piece 22 includes an approximately rectangular flat main wall providing the first surface 14 of the first casing 10, and a first end wall hanging from one longitudinally end side of the main wall toward the second surface 16, the main wall and the first end wall being formed integrally. The first end wall is a part of the peripheral surface of the first casing 10 and it provides the one end surface in which the opening 20 is formed.

The lower half piece 24 includes an approximately rectangular flat main wall providing the second surface 16 of the first casing 10, a second end wall rising from the other longitudinally end side of the main wall toward the first surface 14, and two sidewalls positioned at both lateral sides of the main wall and rising from the both lateral sides toward the first surface 14. The main wall, the second end wall, and the two sidewalls are formed integrally, and they provide a remaining part of the peripheral surface of the first casing 10.

The lower half piece 24 includes an inner partition 26 extending along the second surface 16, and the accommodating portion 18 is provided between the inner partition 26 and the second surface 16. A part of the second surface 16 from the opening 18 of the first end wall to the vicinity of the second end wall is opened excepting both lateral side portions of the second surface 16, the lateral side portions extending in the longitudinal direction of the first casing 10.

In a space region of the first casing 10 between the first surface 14 and the inner partition 26, a first wiring board 28 is accommodated in the vicinity of the second end wall, an operation switch supporting plate 30 having various operation switches is accommodated in the vicinity of the first end wall, and a display 32 is accommodated between the first wiring board 28 and the operation switch supporting plate 30. The first wiring board 28, the various operation switches on the operation switch supporting plate 30, and the display 32 are electrically connected with each other. The first wiring board 28 includes a speaker 34 facing in a direction of the first surface 14 and a known electronic type imaging unit 36 facing in a direction of the second surface 16. A screen of the display 32 and the various operation switches face in the direction of the first surface 14.

A screen exposing window 38 is formed in a part of the first surface 14 of the first casing 10 corresponding to the screen of the display 32, and the screen exposing window 38 is covered with a light-permeable member 40. A sound discharging opening 42 is formed at a position of the first surface 14 of the first casing 10 corresponding to the speaker 34. Various operation portions (hereinafter, the whole of the various operation portions is called as a "first operation portion 44") for operating the various switches are provided in positions of the first surface 14 of the first casing 10 corresponding to the various switches.

An imaging window 46 is formed at a position of the second surface 16 of the first casing 10 corresponding to the electronic type imaging unit 36, and the imaging window 46 is covered with a light-permeable member.

The second casing 12 is configured to be capable of being extended from and retracted into the accommodating portion 18 of the first casing 10 through the opening 20 in the longitudinal direction of the first casing 10, and to be capable of being accommodated in the accommodating portion 18.

The second casing 12 also includes first and second flat and large surfaces 48 and 50 facing in directions opposite to each other, and a peripheral surface connecting an approximately rectangular peripheral edge of the first surface 48 and an approximately rectangular peripheral edge of the second surface 50.

The second casing 12 further includes an upper half piece 52 and a lower half piece 54 fixed to each other by a known fixing element (not shown) such as, for example, a plurality of fixing screws in a manner separable from each other.

The upper half piece 52 includes an approximately rectangular flat main wall providing the first surface 48 of the second casing 12, and a peripheral wall hanging from a peripheral side of the main wall toward the lower half piece 54, the main wall and the peripheral wall being formed integrally. The peripheral wall provides a peripheral surface of the second casing 12.

The lower half piece 54 includes an approximately rectangular flat main wall providing the second surface 50 of the second casing 12.

In a space region between the first surface 48 and the second surface 50 of the second casing 12, the second wiring board 56 is accommodated in one side part located near the opening 20 of the accommodating portion 18 of the first casing 10 when the second casing 12 is accommodated in the accommodating portion 18 of the first casing 10, and a battery accommodating chamber 58 is provided in the other side part located far from the opening 20 of the accommodating portion 18 of the first casing 10 when the second casing 12 is accommodated in the accommodating portion 18 of the first casing 10. A battery 60 for supplying an electric power to the first wiring board 28 and the second wiring board 56 is accommodated in the battery accommodating chamber 58 in a detachable manner.

The second casing 12 includes a second operation portion 62 accompanying a plurality of operation switches electrically connected to the second wiring board 56 at a position of the first surface 48 corresponding to the second wiring board 56, and a microphone opening 64 is formed in the first surface 48 between the second operation portion 62 and the longitudinally one end side of the first surface 48. A microphone 66 is provided at a position of the second wiring board 56 corresponding to the microphone opening 64.

In the space region of the first casing 10 between the first surface 14 and the inner partition 26, a main part of a casing movement guiding/supporting mechanism 68 is further provided. The casing movement guiding/supporting mechanism 68 is interposed between the first casing 10 and the second casing 12 to support the second casing 12 to the accommodating portion 18 of the first casing 10 and to make the second casing 12 being linearly movable in the longitudinal direction of the first casing 10 between the abovementioned retracted position (see FIG. 1) and the abovementioned extended position (see FIG. 2) through the opening 20 in the peripheral wall of the first casing 10.

The casing movement guiding/supporting mechanism 68 is disposed in at least one of two opposite sides 69 of the space region in two directions which intersect a moving locus of the second casing 12 between the retracted position and the extended position along the first surface 14 of the first casing 10, and the guiding/supporting mechanism 68 is disposed at each side 69 of the two opposite sides in the two directions in this embodiment.

Each casing movement guiding/supporting mechanism 68 includes a shaft member 74 which extends along the moving locus of the second casing 12 and which has both end portions 70 and 72 fixed to one of the accommodating portion 18 of the first casing 10 and the second casing 12, and a moving member 76 which is fixed to the other of the accommodating portion 18 of the first casing 10 and the second casing 12 and which is supported by the shaft member 74 to be movable in the longitudinal direction of the shaft member 74. In this embodiment, the both end portions 70 and 72 of the shaft member 74 is fixed to the accommodating portion 18 of the first casing 10 and the moving member 76 is fixed to the second casing 12.

Specifically, in this embodiment, the moving member 76 is fixed to a predetermined position on each of both longitudinally extending lateral sides in the peripheral wall of the upper half piece 52 of the second casing 12. The moving members 76 can be formed integrally with the both lateral sides of the peripheral wall of the upper half piece 52.

Further, in the space region of the first casing 10 between the first surface 14 and the inner partition 26, a biasing unit 78 which biases the second casing 12 from the retracted position (see FIG. 1) toward the extended position (see FIG. 2) is accommodated. In this embodiment, the biasing unit 78 includes a compression coil spring wound around the shaft member 74 of the casing movement guiding and supporting mechanism 68 between the one end portion 70 located far from the opening 20 of the accommodating portion 18 and the moving member 76. The compression coil spring is compressed by a movement of the moving member 76 when the second casing 12 is moved from the extended position to the retracted position and accumulates a biasing force which can bias the second casing 12 from the retracted position to the extended position.

More further, in the space region of the first casing 10 between the first surface 14 and the inner partition 26, a main part 82 of a locking mechanism 80 which selectively locks the second casing 12 at the retracted position (see FIG. 1) in the accommodating portion 18 of the first casing 10 against the biasing force of the biasing unit 78 is accommodated. When the locking mechanism 80 unlocks the second casing 12, the movement of the second casing 12 between the retracted position and the extended position (see FIG. 2) is allowed.

In this embodiment, the main part 82 of the locking mechanism 80 is disposed at an end of the accommodating portion 18 of the first casing 10 in the moving direction of the second casing 12 from the extended position to the retracted position (that is, an end opposite to the opening 20 of the accommodating portion 18).

The locking mechanism 80 includes an engagement protrusion 84 fixed at an end of the peripheral wall of the upper half piece 52 of the second casing 12 positioned on the side opposite to the opening 20 of the accommodating portion 18 when the second casing 12 is disposed at the retracted position, and the engagement protrusion 84 can be formed integrally with the upper half piece 52 of the second casing 12.

The main part 82 of the locking mechanism 80 locks the engagement protrusion 84 of the second casing 12 when the second casing 12 moves from the extended position to the retracted position and reaches at the retracted position, and releases the lock of the engagement protrusion 84 to allow the movement of the second casing 12 from the retracted position to the extended position when the main part 82 of the locking mechanism 80 is operated through a locking mechanism operation window 86 formed in the second end wall of the lower half piece 24 of the first casing 10 positioned opposite to the opening 20 of the accommodating portion 18.

As shown in FIG. 1 to FIG. 3, the first wiring board 28 in the first casing 10 and the second wiring board 56 in the second casing 12 are electrically connected to each other by a wiring cable unit 88. In this embodiment, the wiring cable unit 88 includes a pair of wiring cables 90, each having one end portion 90a electrically connected to the first wiring board 28, the other end portion 90b electrically connected to the second wiring board 90b, and an intermediate portion positioned between the one end portion 90a and the other end portion 90b.

In the space region of the first casing 10 between the first surface 14 and the inner partition 26, the intermediate portions of the pair of wiring cables 90 extend along the two shaft members 74 of the two casing movement guiding/supporting mechanisms 68 in the longitudinally extending both lateral side portions of the lower half piece 24 of the first casing 10.

More specifically, the intermediate portion of each wiring cable 90 is inserted into a cable insertion hole 92 formed in the one end portion 70 of the shaft member 74 of the casing movement guiding/supporting mechanism 68, the one end portion 70 being located near to the first wiring board 28 and being corresponding to the intermediate portion, and then the intermediate portion is inserted into a cable insertion hole 94 (see FIG. 4) formed in the moving member 76 corresponding to the intermediate portion so as to be freely movable in the cable insertion hole 94.

At least one of the first wiring board 28 and the second wiring board 56 is provided with a circuit which can perform various mobile communication functions by combinations of various operations to the first and second operation portions 44 and 62. In this embodiment, the various mobile communication functions includes a mobile phone function using the display 32, the speaker 34, and the microphone 66, an electronic mail function using the display 32, and an electronic camera function using the electronic type imaging unit 36 and the display 32.

In the mobile phone according to this embodiment, as shown in FIG. 1, the second operation portion 62 and microphone opening 64 of the second casing 12 are completely covered with the first casing 10 and the pair of moving members 76 of the pair of casing movement guiding/supporting mechanisms 68 are positioned away from the opening 20 of the accommodating portion 18 of the first casing 10 while the second casing 12 is locked by the locking mechanism 80 so that the second casing 12 is disposed at the retracted position against the biasing force of the biasing means 78. A part of each intermediate portion of the pair of wiring cables 90, located near to the first wiring board 28, extends along the shaft member 74, corresponding to the part of each intermediate portion of the pair of wiring cables 90, between the cable insertion hole 92 of the one end portion 70 of the shaft member 74 and the cable insertion hole 94 of the moving member 76 in the casing movement guiding/supporting mechanism 68, and another part of each intermediate portion of the pair of wiring cables 90, located near to the second wiring board 56, extends along the shaft member 74 on one flat surface of the second casing 12 between the cable insertion hole 94 of the moving member 76 and the other end portion 90b of each wiring cable 90, connected to the second wiring board 56.

In FIG. 1, when the locking mechanism 80 is unlocked, the second casing 12 is biased by the biasing force of the biasing means 78 and is moved linearly by the pair of casing movement guiding/supporting mechanism 68 from the retracted position shown in FIG. 1 to the extended position where the second casing 12 extends from the accommodating portion 18 of the first casing 10 into the external space through the opening 20 as shown in FIG. 2.

Meanwhile, the moving members 76 of the casing movement guiding/supporting mechanisms 68 fixed to the second casing 12 move on the shaft members 74 toward the opening 20 of the accommodating portion 18 of the first casing 10. The other parts of the intermediate portions of the pair of wiring cables 90, extending along the shaft portions 74 on the one flat surface of the second casing 12, are pulled into the cable insertion holes 94 of the moving members 76 of the casing movement guiding/supporting mechanisms 68 to be arranged along the shaft members 74 between the cable insertion holes 94 of the one end portions 70 of the shaft members 74, located near to the first wiring board 28, and the moving members 76.

When the second casing 12 arrives at the extended position shown in FIG. 2, the second operation portion 62 and microphone opening 64 of the second casing 12 are completely exposed in the external space so that they can be used freely.

The pair of moving members 76 of the pair of casing movement guiding/supporting mechanisms 68 is arranged near to the opening 20 of the accommodating portion 18 of the first casing 10. And, almost all of each intermediate portion of the pair of wiring cables 90 extends along the shaft member 74 between the cable insertion hole 92 of the one end portion 70 of the shaft member 74 and the cable insertion hole 94 of the moving member 76 in the casing movement guiding/supporting mechanism 68 corresponding to each intermediate portion of the pair of wiring cables 90, and the remainders of the intermediate portions between the cable insertion holes 94 of the moving members 76 and the other end portions 90b, connected to the second wiring board 56, extends along the shaft member 74 on the one flat surface of the second casing 12.

That is, in the casing movement guiding/supporting mechanism 68 interposed between the first casing 10 and the second casing 12, a combination of the one end portion 70 of the shaft member 74, formed with the cable insertion hole 92, and the moving member 76, formed with the cable insertion hole 94, provides a cable movement guiding mechanism which guides a movement of the intermediate portion of the wire cable 90 while the second casing 12 is moved between the retracted position and the extended position.

The cable movement guiding mechanism provides high reliability to an electrical connection between the first wiring board 28 and the second wiring board 56 by the wring cable unit 88 without largely increasing respective thicknesses of the first and second casings 10 and 12 supported by the pair of casing movement guiding/supporting mechanism 68 to be linearly movable.

The biasing unit 78 interposed between the first casing 10 and the-second casing 12 to bias the second casing 12 from the retracted position to the extended position is not limited to the compression coil springs 78 wound around the shaft members 74 of the pair of casing movement guiding/supporting mechanisms 68 between the one end portions 70 of the shaft members 74 and the moving members 76 but it can be various known structures.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable terminal comprising:
a first casing including a first wiring board,
a first operation portion, a first surface on which the first operation portion is disposed, a second surface which faces in a direction opposite to the first surface, a peripheral surface which connects a peripheral edge of the first surface and a peripheral edge of the second surface, and an accommodating portion which is disposed between the first surface and the second surface and which is opened in the peripheral surface;
a second casing including a second wiring board which is electrically connected to the first wiring board, a second operation portion, a first surface on which the second operation portion is disposed, and a second surface which faces in a direction opposite to the first surface, the second casing being configured to be accommodated in the accommodating portion of the first casing through the opening;
a casing movement guiding/supporting mechanism interposed between a side portion of the first casing and a side portion of the second casing in at least one of two direct opposite directions which intersect a moving locus of the second casing between a retracted position and an extended position along the first surface of the first casing, at the retracted position the second casing being accommodated in the accommodating portion of the first casing and at the extended position the second casing being extended from the accommodating portion into an external space through the opening, and the guiding/supporting mechanism supporting the second casing to be movable linearly in a longitudinal direction of the first casing between the retracted position and the extended position;
a locking mechanism selectively locking the second casing at the retracted position, and allowing a movement of the second casing between the retracted position and the extended position when the locking mechanism unlocks the second casing; and a battery accommodating chamber provided in at least one of the first casing and the second casing and accommodating a battery for supplying electricity to the first wiring board and the second wiring board,
wherein the second surface of the first casing includes an opening which exposes at least one part of the second surface of the second casing disposed at the retracted position.

2. The portable terminal according to claim 1, further comprising a biasing unit which biases the second casing from the retracted position toward the extended position.

3. The portable terminal according to claim 1, wherein the casing movement guiding/supporting mechanism is interposed between both side portions of the first casing and both side portions of the second casing in two direct opposite directions intersecting the moving locus of the second casing between the retracted position and the extended position along the first surface of the first casing.

4. The portable terminal according to claim 1, wherein at least one of the first casing and the second casing includes a display.

5. The portable terminal according to claim 1, wherein the locking mechanism is disposed at an end in the accommodating portion of the first casing in a moving direction of the second casing from the extended position to the refracted position.

6. A portable terminal comprising: a first casing including a first wiring board, a first operation portion, a first surface on which the first operation portion is disposed, a second surface which faces in a direction opposite to the first surface, a peripheral surface which connects a peripheral edge of the first surface and a peripheral edge of the second surface, and an accommodating portion which is disposed between the first surface and the second surface and which is opened in the peripheral surface;
a second casing which includes a second wiring board, a second operation portion, a first surface on which the second operation portion is disposed, and a second surface which faces in a direction opposite to the first surface, the second casing being configured to be accommodated in the accommodating portion of the first casing through the opening;
a casing movement guiding/supporting mechanism interposed between a side portion of the first casing and a side portion of the second casing in at least one of two direct opposite directions which intersect a movement locus of the second casing between a retracted position and an extended position along the first surface of the first casing, at the retracted position the second casing being accommodated in the accommodating portion of the first casing and at the extended position the second casing being extended from the accommodating portion into an external space through the opening, and the guiding/supporting mechanism supporting the second casing to be movable linearly between the retracted position and the extended position;
a wiring cable including one end portion which is electrically connected to the first wiring board, the other end portion which is electrically connected to the second wiring board, and an intermediate portion between the one end portion and the other end portion;
a cable movement guiding mechanism interposed between the first casing and the second casing and guiding a movement of the intermediate portion of the wiring cable when the second casing is moved between the retracted position and the extended position;
a locking mechanism selectively locking the second casing at the retracted position, and allowing a movement of the second casing between the retracted position and the extended position when the locking mechanism unlocks the second casing; and a battery accommodating chamber provided in at least one of the first casing and the second casing and accommodating a battery for supplying electricity to the first wiring board and the second wiring board.

7. The portable terminal according to claim 6, further comprising a biasing unit which biases the second casing from the retracted position toward the extended position.

8. The portable terminal according to claim 6, wherein the second surface of the first casing includes an opening which exposes at least one part of the second surface of the second casing disposed at the retracted position.

9. The portable terminal according to claim 6,
wherein the casing movement guiding/supporting mechanism includes a shaft member which extends along the moving locus and which has both end portions fixed to one of the accommodating portion of the first casing and the second casing, and a moving member which is fixed to the other of the accommodating portion of the first casing and the second casing and which is supported by the shaft member so as to be movable in a longitudinal direction of the shaft member.

10. The portable terminal according to claim 9, wherein the shaft member is fixed to the accommodating portion of the first casing, and the moving member is fixed to the second casing, and one end portion of the shaft member and the moving member hold the intermediate portion of the wiring cable and also function as the cable movement guiding mechanism.

11. The portable terminal according to claim 9, further comprising a biasing unit which biases the second casing from the retracted position toward the extended position.

12. The portable terminal according to claim 11, wherein the shaft member is fixed to the accommodating portion of the first casing, and the moving member is fixed to the second casing, and the biasing unit includes a compression coil spring which is wound around the shaft member and which is compressed by a movement of the moving member caused by the movement of the second casing from the extended position to the retracted position so that elastic force for biasing the second casing from the retracted position to the extended position is accumulated.

13. The portable terminal according to claim 6, wherein the casing movement guiding/supporting mechanism is interposed between both side portions of the first casing and both side portions of the second casing in two direct opposite directions intersecting the moving locus of the second casing between the retracted position and the extended position along the first surface of the first casing.

14. The portable terminal according to claim 13, wherein the casing movement guiding/supporting mechanism includes a shaft member which extends along the moving locus and which has both end portions fixed to one of the accommodating portion of the first casing and the second casing, and a moving member which is fixed to the other of the accommodating portion of the first casing and the second casing and which is supported by the shaft member so as to be movable in a longitudinal direction of the shaft member.

15. The portable terminal according to claim 14, wherein the shaft member is fixed to the accommodating portion of the first casing, and the moving member is fixed to the second casing, and one end portion of the shaft member and the moving member hold the intermediate portion of the wiring cable and also function as the cable movement guiding mechanism.

16. The portable terminal according to claim 14, further comprising a biasing unit which biases the second casing from the retracted position toward the extended position.

17. The portable terminal according to claim 16, wherein the shaft member is fixed to the accommodating portion of the first casing, and the moving member is fixed to the second casing, and the biasing unit includes a compression coil spring which is wound around the shaft member and which is compressed by a movement of the moving member caused by the movement of the second casing from the extended position to the retracted position so that elastic force for biasing the second casing from the retracted position to the extended position is accumulated.

18. The portable terminal according to claim 6, wherein at least one of the first casing and the second casing includes a display.

19. The portable terminal according to claim 6, wherein the locking mechanism is disposed at an end in the accommodating portion of the first casing in a moving direction of the second casing from the extended position to the refracted position.

* * * * *